(12) United States Patent
Eberhardt et al.

(10) Patent No.: US 11,840,946 B2
(45) Date of Patent: *Dec. 12, 2023

(54) BREATHER SHAFT

(71) Applicant: ARCTIC CAT INC., Minneapolis, MN (US)

(72) Inventors: Ryan Robert Eberhardt, Thief River Falls, MN (US); Bradley Mauch, Thief River Falls, MN (US)

(73) Assignee: ARCTIC CAT INC., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,050

(22) Filed: Oct. 10, 2022

(65) Prior Publication Data
US 2023/0032449 A1 Feb. 2, 2023

Related U.S. Application Data

(63) Continuation of application No. 15/831,326, filed on Dec. 4, 2017, now Pat. No. 11,466,602.

(60) Provisional application No. 62/429,595, filed on Dec. 2, 2016.

(51) Int. Cl.
*F01M 13/04* (2006.01)
*F16H 57/027* (2012.01)

(52) U.S. Cl.
CPC ........... *F01M 13/04* (2013.01); *F16H 57/027* (2013.01); *F01M 2013/0422* (2013.01)

(58) Field of Classification Search
CPC ............ F01M 13/04; F01M 2013/0422; F16H 57/027
See application file for complete search history.

(56) References Cited

U.S. PATENT DOCUMENTS

| | | |
|---|---|---|
| 2,818,047 A | 12/1957 | Powell |
| 5,618,335 A | 4/1997 | Pink et al. |
| 7,309,308 B2 | 12/2007 | Berger et al. |
| 7,547,185 B2 | 6/2009 | Giesler et al. |
| 8,166,958 B2 | 5/2012 | Rice et al. |

(Continued)

OTHER PUBLICATIONS

"Final Office Action received for U.S. Appl. No. 15/831,326, dated Jan. 5, 2022.".

(Continued)

*Primary Examiner* — Jacob M Amick
*Assistant Examiner* — Ruben Picon-Feliciano
(74) *Attorney, Agent, or Firm* — Kutak Rock LLP; Brian L. Main

(57) ABSTRACT

A system for and method of separating oil from crankcase air is provided. The system includes replacing a standard shaft, such as a water pump shaft, with a breather shaft of the present invention and venting crankcase air through the breather shaft to an outside volume of air, such as in an air box. The breather shaft includes a centrifuge positioned within an interior volume of the crankcase and a first portion extending from the centrifuge through a wall of the crankcase. The centrifuge defines a plurality of inlet passageways extending from an outer surface of the centrifuge towards an interior area of the centrifuge. The first portion of the breather shaft defines a venting passageway extending from the interior area of the centrifuge to a vent opening at a distal end of the breather shaft.

17 Claims, 15 Drawing Sheets

(56) References Cited

U.S. PATENT DOCUMENTS

| | | | |
|---|---|---|---|
| 11,466,602 B2* | 10/2022 | Eberhardt | F01M 13/04 |
| 2011/0312427 A1* | 12/2011 | Meusel | F01L 1/047 |
| | | | 464/183 |
| 2015/0114327 A1 | 4/2015 | Isechi | |
| 2018/0179930 A1 | 6/2018 | Eberhardt et al. | |

OTHER PUBLICATIONS

"Final Office Action received for U.S. Appl. No. 15/831,326, dated Jan. 27, 2020, 17 Pages", 17.

"Final Office Action received for U.S. Appl. No. 15/831,326, dated Sep. 3, 2020.".

"Non- Final Action received for U.S. Appl. No. 15/831,326, dated Jun. 28, 2021".

"Non Final Office Action Received for U.S. Appl. No. 15/831,326, dated May 8, 2020, 12 Pages".

"Notice of Allowance received for U.S. Appl. No. 15/831,326, dated Jun. 2, 2022.".

Eberhardt, Robert Ryan, "Non Final Office Action Received for U.S. Appl. No. 15/831,326, dated Jun. 17, 2019, 14 Pages".

* cited by examiner

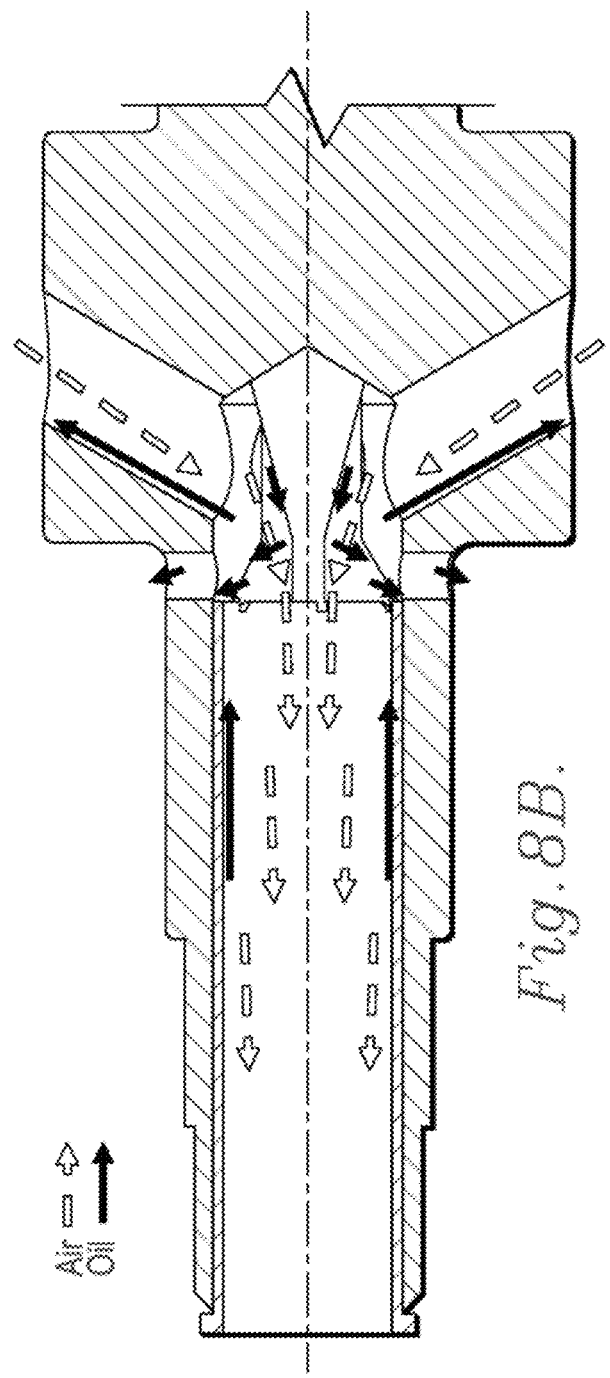

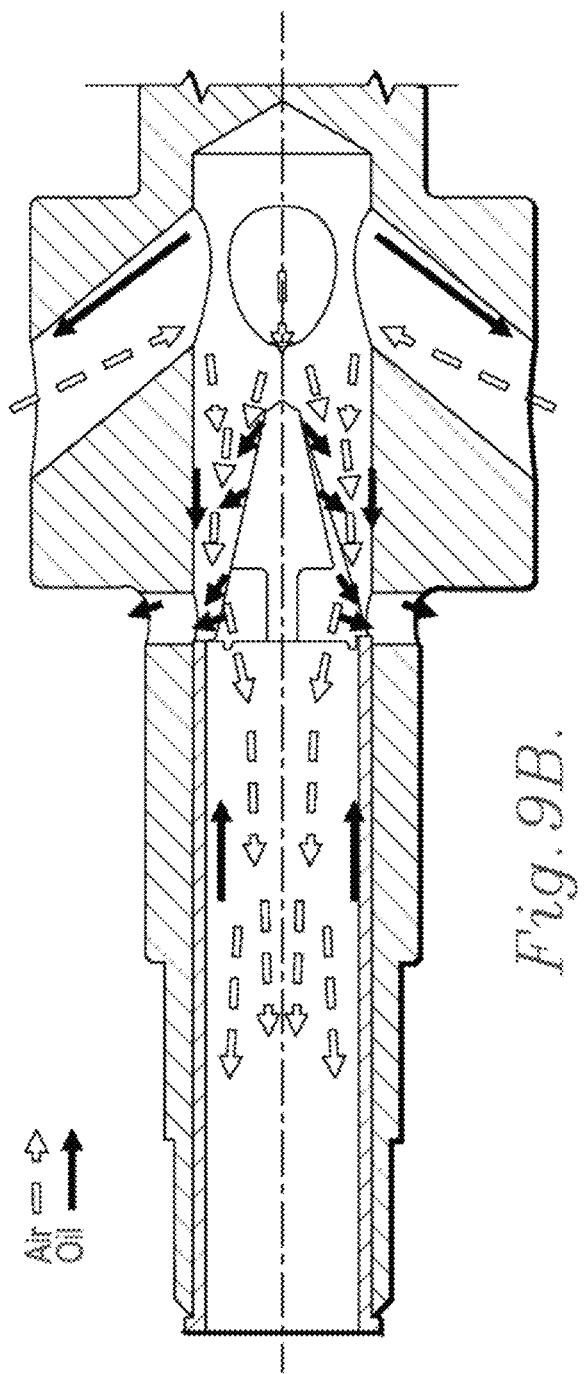

BREATHER SHAFT

CROSS-REFERENCE TO RELATED APPLICATIONS

This application is a continuation application of U.S. patent application Ser. No. 15/831,326, filed Dec. 4, 2017, now U.S. Pat. No. 11,466,602, which claims priority pursuant to 35 U.S.C. 119(e) to U.S. Provisional Patent Application Ser. No. 62/429,595, filed Dec. 2, 2016, the entire disclosures of which are incorporated herein by reference.

FIELD OF THE INVENTION

The present invention relates generally to engine ventilation, and engines and off-road vehicles making use of the same. More specifically, the present invention is concerned with engines and systems for and methods of venting air from a rotating shaft of the engine. The rotating shaft may include one or more features for separating oil from the vented air and returning the oil to the engine crankcase.

BACKGROUND

Crankcase pressure is increased with the down stroke of a piston, creating potential for damage to seals and/or decreased engine efficiency. To alleviate these problems, excess air must be vented from the crankcase. Venting air from the crankcase is complicated by the presence of lubricating oil in the crankcase, however.

Various systems and methods have been used to separate oil from crankcase air so as to control crankcase pressure while minimizing pollution and preserving oil within the crankcase. Unfortunately, many such systems are large, cumbersome, expensive, and/or inefficient. Consequently, there remains a need for engines and engine systems that are capable of efficiently separating oil from crankcase air.

SUMMARY

In some examples, an engine comprises a breather shaft defining a plurality of passageways. In some examples, a method of utilizing the breather shaft to vent air from an engine crankcase while separating oil from the vented air is disclosed. In some embodiments the breather shaft is a water pump shaft extending through an exterior wall of the crankcase.

The breather shaft defines one or more passageway in fluid communication with the crankcase and a volume of air positioned outside of the crankcase. In some embodiments, the volume of air outside of the crankcase is an open volume of air, such as the environment. In some embodiments, the volume of air outside of the crankcase is enclosed, such as within an air box. In some such embodiments, a breather hose extends between the breather shaft and the volume of air so as to facilitate fluid communication between the volume of air and the crankcase. In this way, higher pressure within the crankcase forces crankcase air through the one or more passageway of the breather shaft towards the volume of air, separating oil from the crankcase air along the way. In some embodiments, oil is further separated from the crankcase air as the air travels between the breather shaft and the volume of air (e.g., air box, environment). In some such embodiments, such separated oil drains back into the crankcase, for example via the breather shaft or tube. By way of example, oil within the breather shaft is expelled back into the crankcase as air from the crankcase travels through the breather shaft towards the volume of air.

In some embodiments, the breather shaft includes one or more inlet passageway extending from the crankcase towards an interior area of the breather shaft, thereby serving as an initial passageway for crankcase air to travel from the crankcase towards the volume of air. In some such embodiments, the one or more inlet passageway further serves as an oil discharging passageway, the oil discharging passageway being configured to allow oil to be discharged from the breather shaft while allowing air to flow into the breather shaft. In some embodiments, the breather shaft defines an oil expelling passageway that is separate from the inlet passageway. In some embodiments, the one or more oil discharge passageway is a shared passageway with the one or more inlet passageway. In some embodiments, the breather shaft defines a plurality of inlet passageways and at least one separate oil expelling passageway, each passageway being configured to expel oil from the breather shaft to the crankcase.

In some embodiments, the breather shaft includes a centrifuge situated within an interior volume of a crankcase and a first portion extending from the centrifuge through a wall of the crankcase. In some such embodiments, the centrifuge defines a plurality of inlet passageways extending from the interior volume of the crankcase to an interior area of the breather shaft. In some embodiments, the first portion of the breather shaft defines a venting passageway extending from the interior area of the breather shaft towards a volume of air positioned outside of the crankcase. In some embodiments, the venting passageway is defined at least in part by an insert secured within a bore of the breather shaft. In some such embodiments, the bore is concentric with a rotational axis of the breather shaft. In some embodiments, the first portion of the breather shaft is a hollow shaft defining at least part of the bore. In some embodiments, the bore extends into the centrifuge.

In some embodiments, the centrifuge defines an interior volume in communication with the venting passageway. In some such embodiments, at least a portion of the interior volume is defined by an interior surface of the centrifuge. In some embodiments, the centrifuge defines an inlet passageway extending from a first opening defined by an exterior surface of the centrifuge to a second opening defined by an interior surface of the centrifuge. In some such embodiments, the first opening is positioned a first distance radially outboard from an axis of rotation of the breather shaft and the second opening is positioned between the first opening and the axis of rotation. In various embodiments, air from within the crankcase is allowed to travel through the inlet passageway prior to traveling out of the crankcase through the venting passageway. In some embodiments, the centrifuge defines a plurality of radially spaced apart inlet passageways. Referring to FIG. 2E, some such embodiments include a plurality of equally spaced apart inlet passageways.

The breather shaft is configured to rotate during engine operation. As such, crankcase air entering an inlet passageway during operation of the engine is driven against a surface of the inlet passageway and/or is caused to circulate within the venting passageway. In some embodiments, the surface of the inlet passageway is configured such that at least some oil within the crankcase air is caused to precipitate from the crankcase air onto the surface of the inlet passageway. In this way, oil droplets are caused to form on the surface of the inlet passageway. Centrifugal forces associated with the rotation of the breather shaft and/or the crankcase oil then cause the oil droplets to move outward away from an axis of rotation of the breather shaft. In some embodiments, centrifugal forces cause the oil to be ejected from the inlet passageway through a first opening. In some such embodiments, crankcase air simultaneously enters the inlet passageway through the first opening of the inlet passageway as the high pressure air within the crankcase begins to migrate out towards the lower pressure air outside of the crankcase.

In some embodiments, the breather shaft defines one or more oil discharge passageway in communication with the interior volume of the breather shaft. Each oil discharge passageway extends from the interior volume of the breather shaft to an oil discharge opening defined by an exterior surface of the breather shaft. In some such embodiments, the oil discharge opening is defined by an exterior surface of the first portion of the breather shaft. In some embodiments, the oil discharge opening is defined by an exterior surface of the centrifuge.

The breather shaft is configured to separate oil from crankcase air and to direct the separated oil back into the crankcase through one or more oil discharge passageway and/or through one or more inlet passageway while allowing at least some of the air to escape the crankcase through a venting passageway. In some such embodiments, the breather shaft includes one or more oil separation mechanism. In some embodiments, the inlet passageway serves as an oil separation mechanism. In some embodiments, one or more oil separation mechanism is positioned within the interior area of the centrifuge.

In some embodiments, the first portion of the breather shaft is coupled to the centrifuge at a proximal end of the first portion of the breather shaft. In other embodiments, a distal end of the breather shaft defines a vent opening in fluid communication with the venting passageway such that air traveling through the breather shaft exits the breather shaft through the vent opening.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

One or more preferred embodiments of the invention, illustrative of the best mode in which the applicant has contemplated applying the principles, is set forth in the following description and is shown in the drawings and is particularly and distinctly pointed out and set forth in the appended claims.

FIG. 8B is a sectional view of the breather shaft of FIG. 8A.

FIG. 9B is a sectional view of the breather shaft of FIG. 9A, the view further showing arrows indicating airflow and oil flow.

DETAILED DESCRIPTION

One or more embodiments of the present invention are disclosed herein; however, it is to be understood that the one or more embodiments are merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the teachings herein in any appropriately detailed structure.

Figure 1:
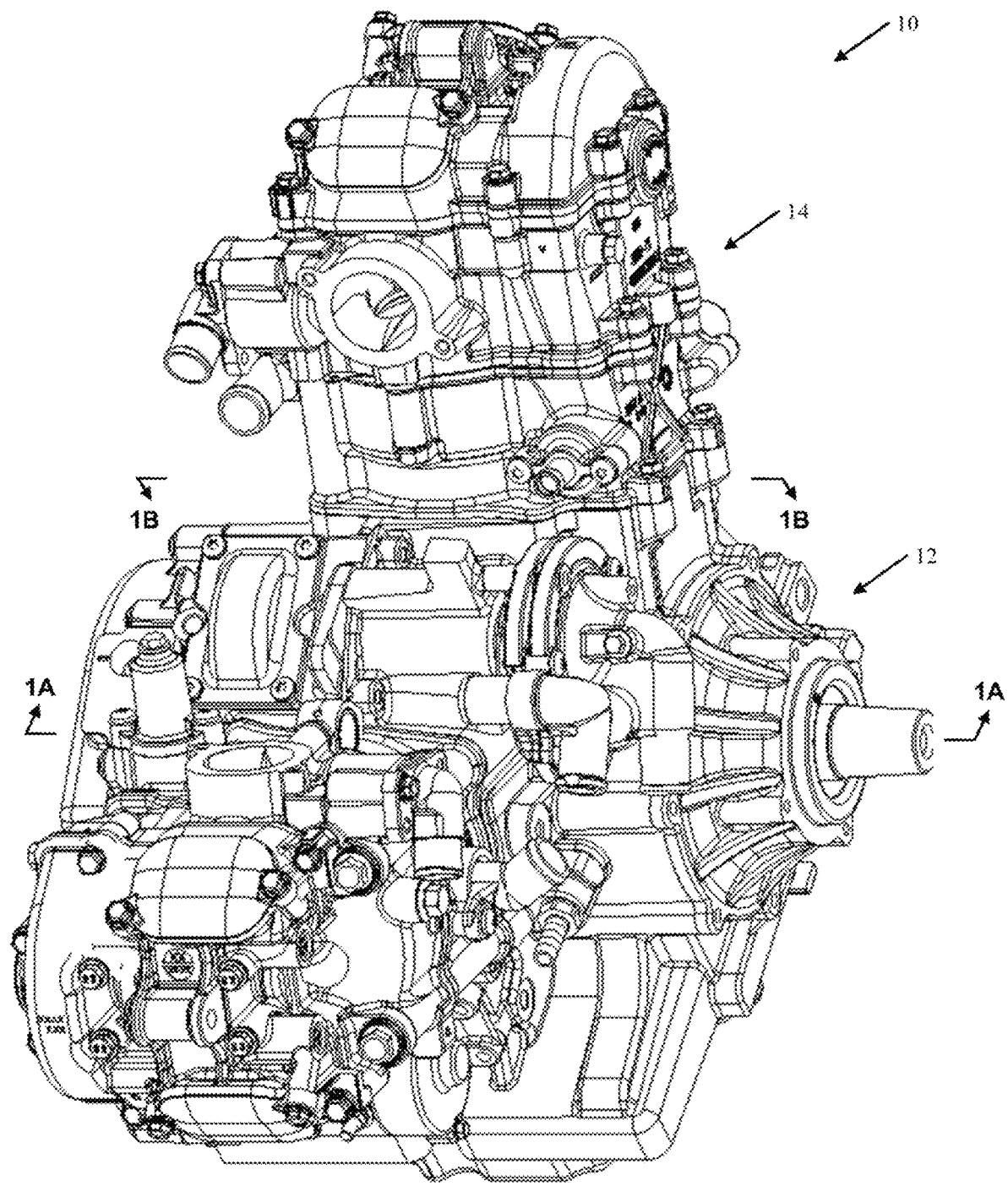
FIG. 1 is an isometric view of an embodiment of an internal combustion engine.
Figure 1A:
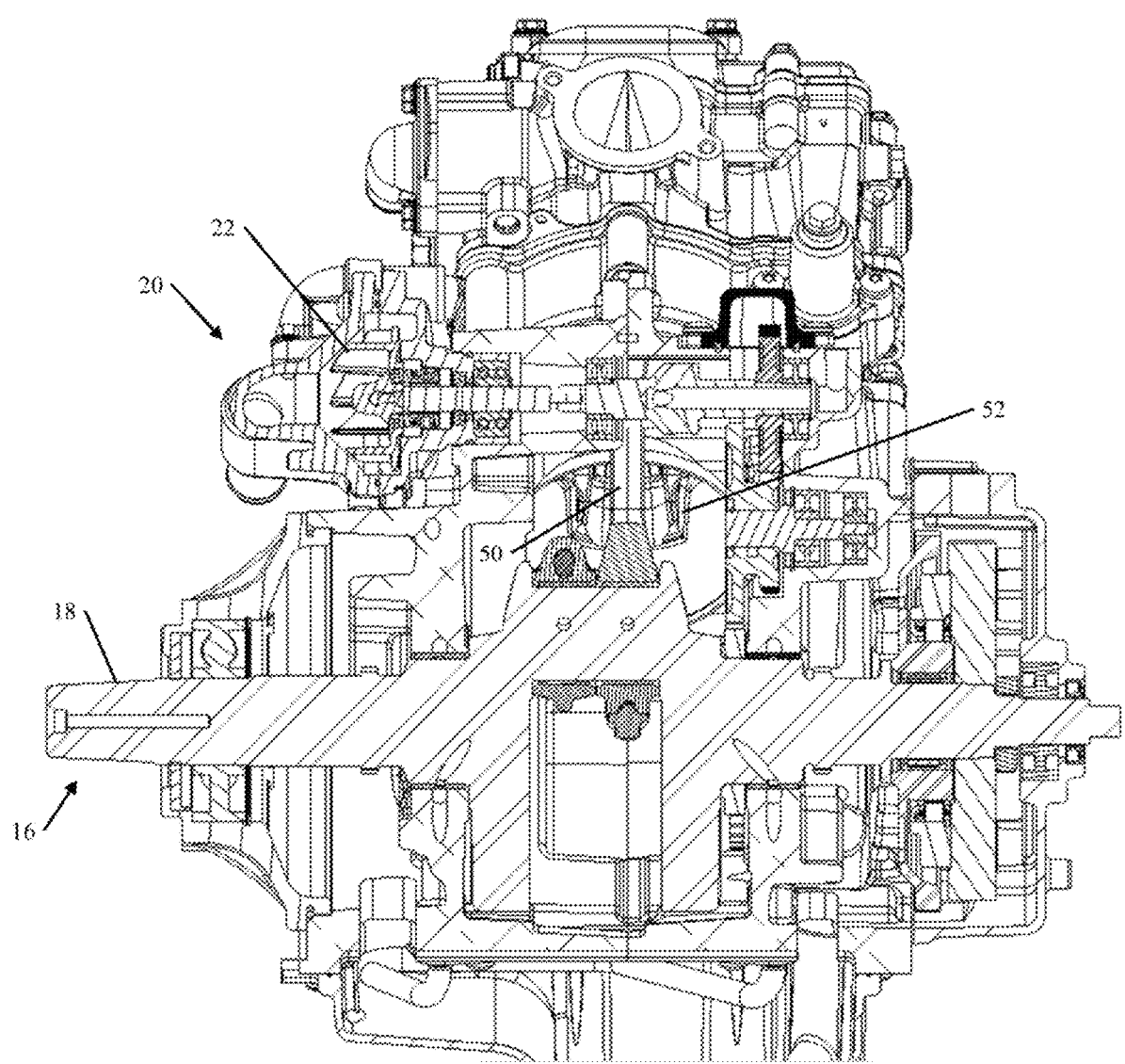
FIG. 1A is a sectional view of the engine of FIG. 1 taken along line 1A-1A of FIG. 1.
Figure 1B:
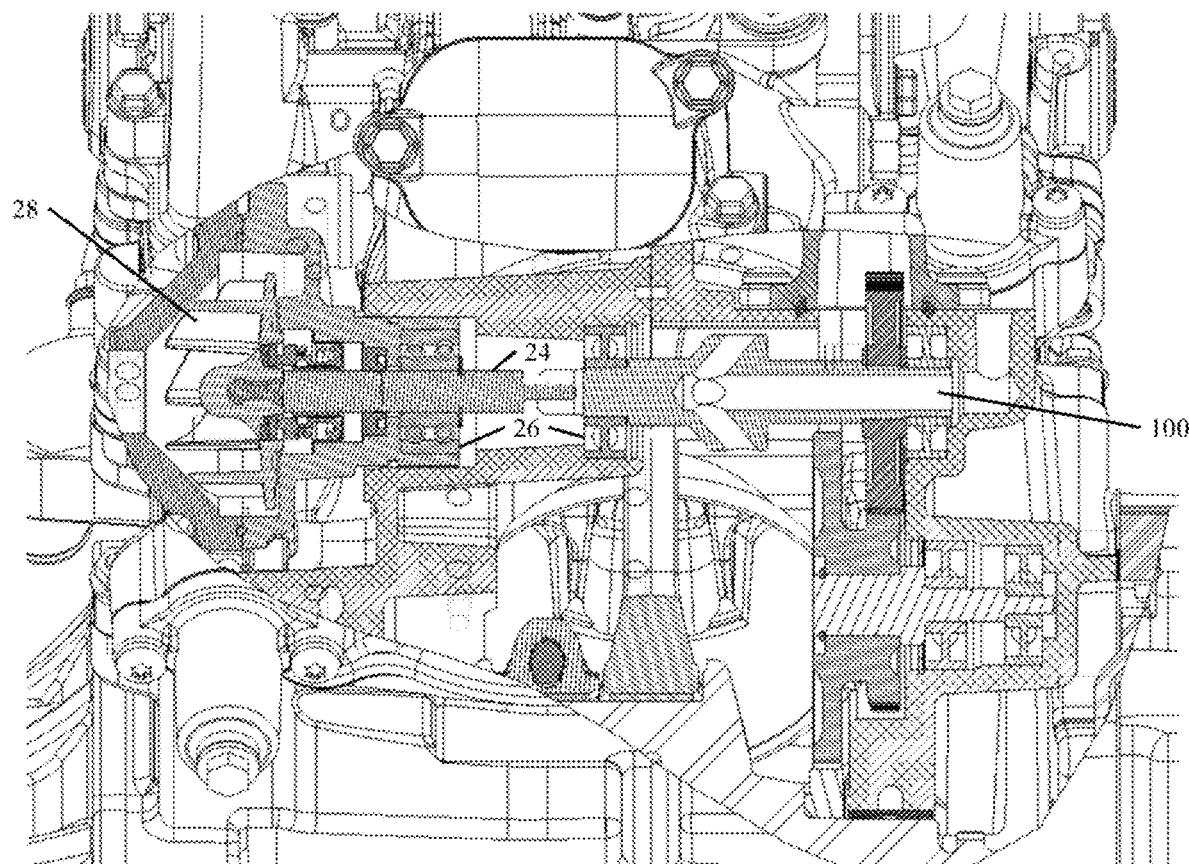
FIG. 1B is a detailed sectional view of the engine of FIG. 1 taken along line 1B-1B of FIG. 1.

With regard to FIG. 1, in some embodiments, an engine 10 comprises a crankcase 12, and at least one cylinder head 14. The engine 10 further comprises a rotating assembly 16, which includes a crankshaft 18, at least one connecting rod 50, and piston 52 (FIG. 1A). In at least some embodiments, the engine 10 further comprises a coolant circulating assembly 20 for cooling the engine 10. In some embodiments, the coolant circulating assembly 20 comprises a water pump assembly 22. In some embodiments, the water pump assembly 22 includes water pump 28 and a water pump shaft 24 (FIG. 1). The water pump shaft 24 is supported by one or more bearings 26 (e.g., ball or roller bearings). In some embodiments, the water pump shaft 24 is connected to a breather shaft 100, as discussed in greater detail below. In some embodiments, the breather shaft 100 is also supported by one or more bearings 26 (e.g., ball or roller bearings).

Figure 2:
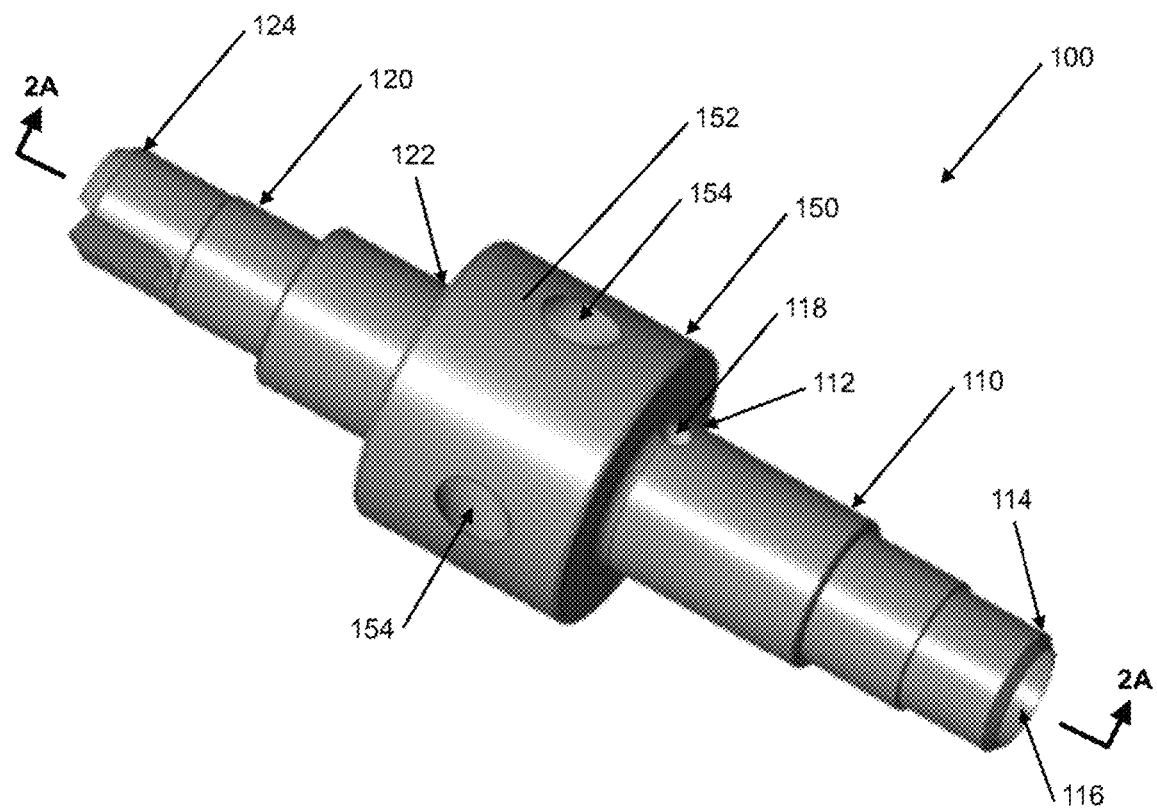
FIG. 2 is an isometric view of a breather shaft.

Referring to FIG. 2, in some embodiments, a breather shaft 100 comprises first 110 and second 120 sections having respective opposed proximal 112, 122 and distal 114, 124 ends. In some embodiments, a centrifuge 150 is positioned between the first 110 and second 120 sections of the breather shaft 100 such that the first and second sections each extend from opposed ends of the centrifuge, with respective proximal ends 112, 122 of respective first and second portions being secured to the centrifuge and respective distal ends 114, 124 being displaced from the centrifuge. In some embodiments, the proximal and distal ends are formed integrally with the centrifuge, for example out a single piece of material which can be machined. Other methods of manufacture are also contemplated, for example additive manufacturing, welding, etc. In some embodiments, the centrifuge, the first portion, and the second portion each have a generally cylindrical shape with the centrifuge having a larger diameter than the first and second portions. In some embodiments, the centrifuge 150 defines at least part of an interior area 105 (FIG. 2A) of the breather shaft 100.

In some embodiments, an outer surface 152 of the centrifuge 150 defines an inlet opening 154 of an inlet passageway 155 in fluid communication with the interior area 105 of the breather shaft. In some embodiments, the distal end 114 of the first portion defines a vent opening 116 of a venting passageway 115 that is in fluid communication with an interior area 105 of the breather shaft. In some embodiments, one or more inlet passageway 155 of the centrifuge 150 is in fluid communication with one or more venting passageway 115 of the first portion 110 so as to allow fluid, such as crankcase air, to flow into the breather shaft 100 through one or more inlet opening 154 and out of the breather shaft 100 through one or more vent opening 116.

Figure 2A:
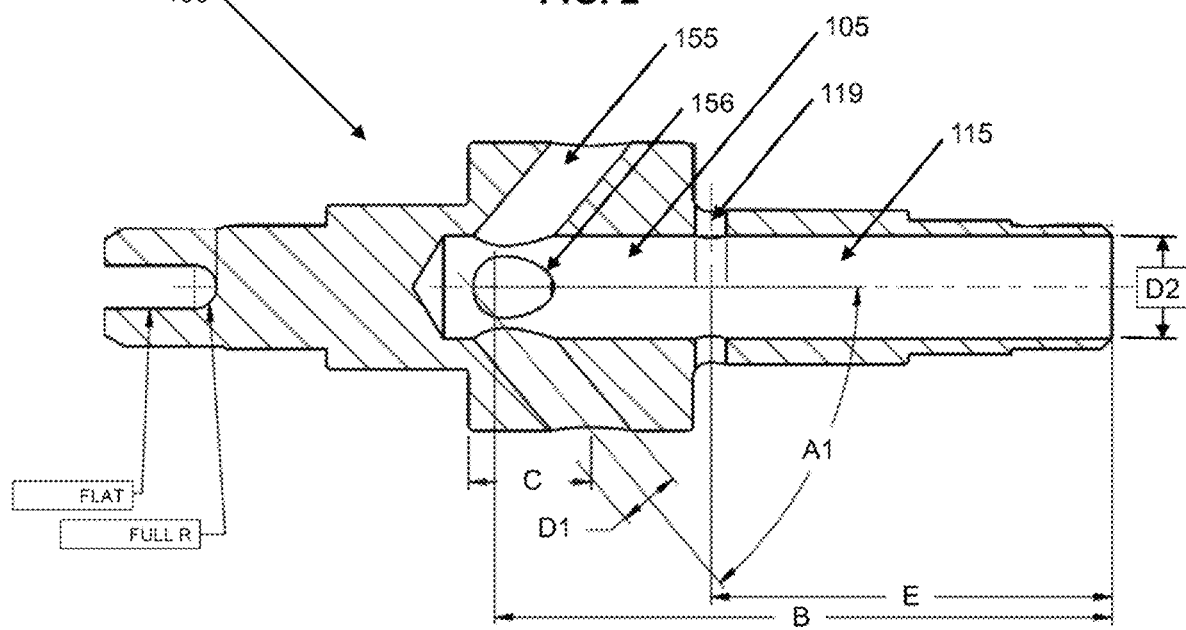
FIG. 2A is a sectional view of the breather shaft of FIG. 2 taken along line 2A-2A of FIG. 2.

Referring to FIG. 2A, inlet passageways of some embodiments of breather shafts are angled away from the first portion of the breather shaft such that air traveling through the breather shaft must first travel away from the vent opening prior to entering the venting passageway. In this way, the distance of the passageway is increased and air transitioning from the inlet passageway to the venting passageway must make a sharp turn. In some embodiments, such configurations increase the amount of oil that collects on the exterior walls of the passageways. In some such embodiments, an inlet angle (A1) measured between an axis of the inlet passageway and an axis of the venting passageway is between approximately 40 and 60 degrees. In other such embodiments, the inlet angle is between approximately 10 and 30 degrees. In still other such embodiments, the inlet angle is between approximately 60 and 90 degrees. In yet other such embodiments, at least part of the inlet passageway is approximately parallel with the venting passageway. In some embodiments, the inlet passageway defines a first interior diameter (D1) and the venting passageway defines a second interior diameter (D2).

Figure 2B:
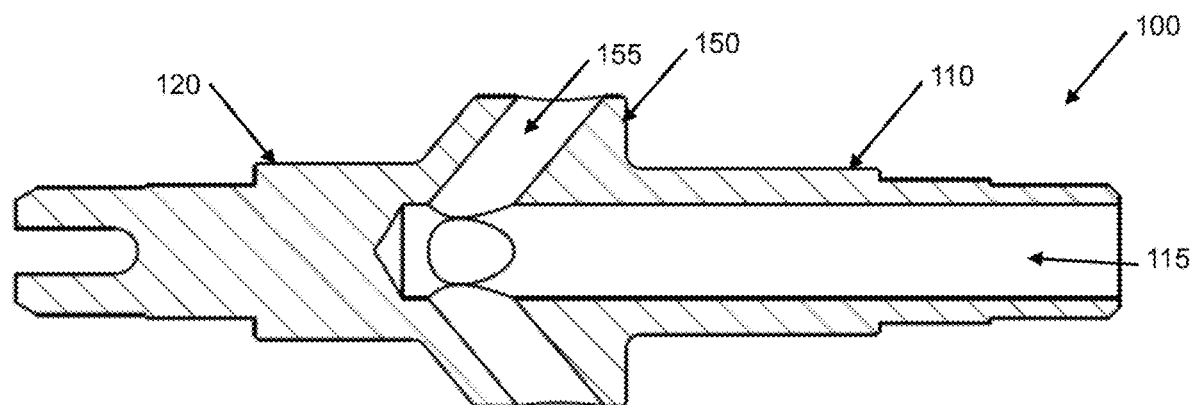
FIG. 2B is a sectional view of another embodiment of a breather shaft.
Figure 2C:
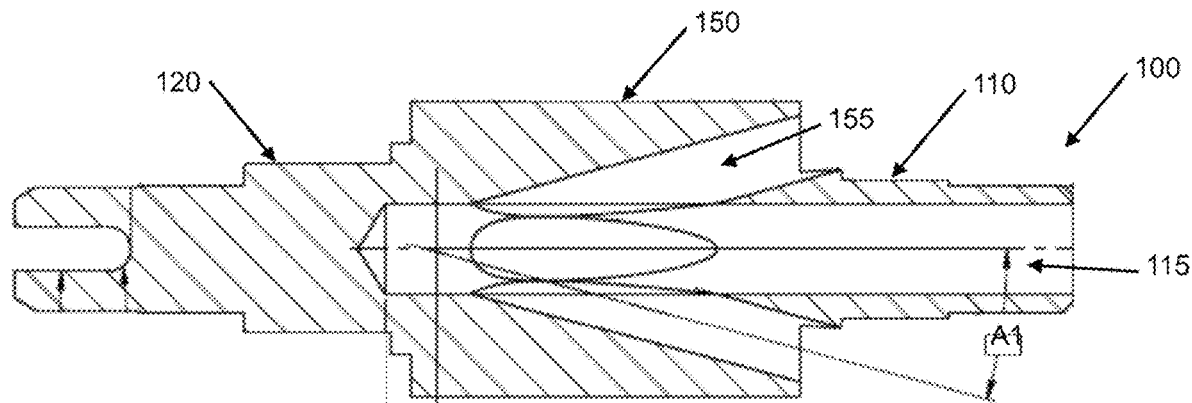
FIG. 2C is a sectional view of another embodiment of a breather shaft.

Still referring to FIG. 2A, some embodiments include an oil discharging passageway 119. In some such embodiments, the oil discharging passageway is defined by a first portion 110 of the breather shaft 100 at or near a proximal end 112 of the first portion 110. In some embodiments, the oil discharging passageway 119 is offset from the proximal end 112 of the first portion 110; the oil discharging passageway 119 can be located along the length of the breather shaft 100 in any suitable location. In some embodiments, the oil discharging passageway 119 extends radially from the venting passageway 115 to an oil discharge opening 118. In some embodiments, the oil discharging passageway 119 is perpendicular to the venting passageway 115. In some embodiments, the oil discharging passageway 119 extends radially from the venting passageway 115 to an oil discharge opening 118 at a non-perpendicular angle relative to the longitudinal axis of the breather shaft 100. In some embodiments, such as shown in FIG. 2B, the breather shaft 100 does not include a separate oil discharge passageway. In some such embodiments, one or more inlet passageway 155 serves as one or more oil discharge passageway.

Figure 2D:
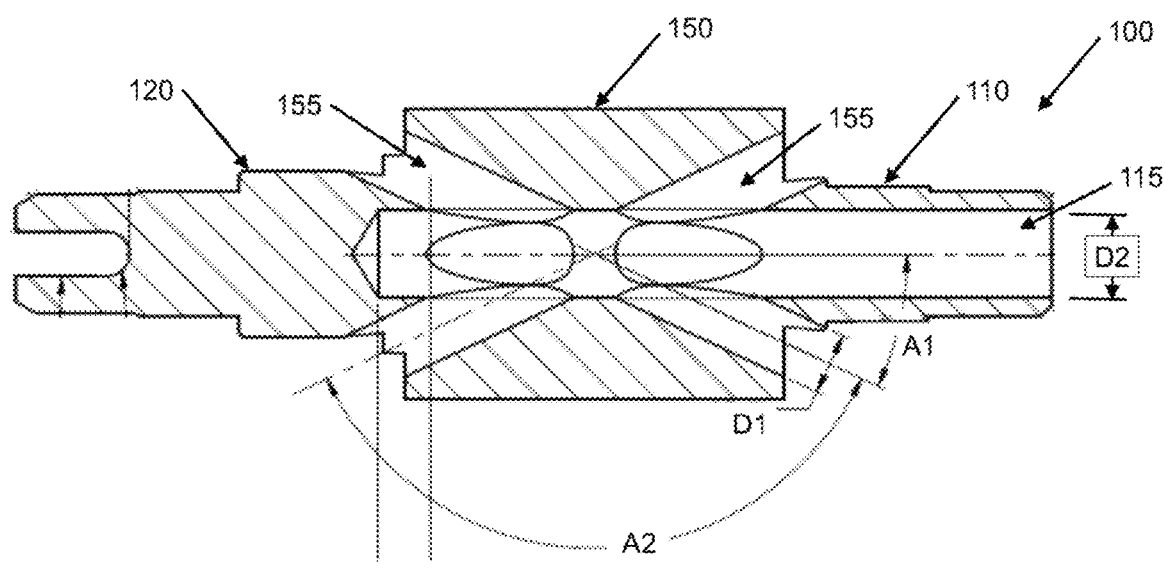
FIG. 2D is a sectional view of another embodiment of a breather shaft.
Figure 2E:
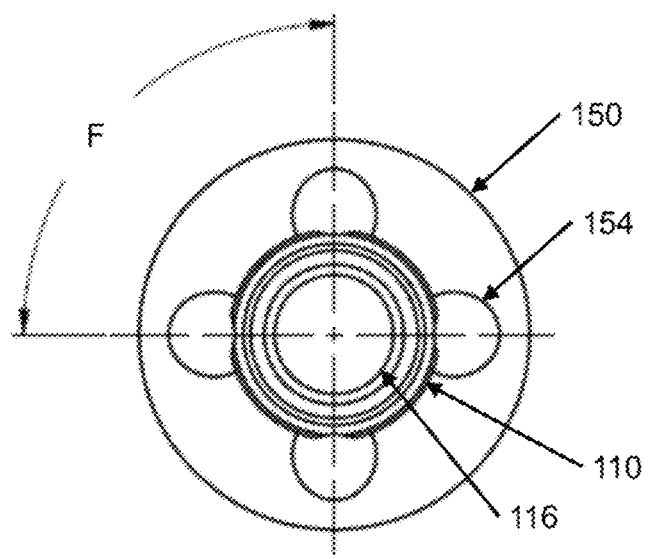
FIG. 2E is an end view of the breather shaft of FIG. 2D.

Referring to FIG. 2D, one or more inlet passageway 155 of some embodiments of breather shafts are angled towards the first portion 110 of the breather shaft 100 such that air transitioning from the inlet passageway 155 to the venting passageway 115 need not make a sharp turn. In some such embodiments, the breather shaft 100 further includes one or more venting passageway 115 that extends from a vent opening 116 to an interior area 105 of the breather shaft 100. In some embodiments, inlet passageways 155 extend from both directions towards an interior area 105 of the breather shaft 100, thereby decreasing the volumetric flow rate of air flowing through each of the inlet passageways 155 by doubling the cross-sectional area of the inlet. In this way, the amount of time air dwelling within an inlet passageway can be increased. In some embodiments, a differential inlet angle (A2) measured between the longitudinal axis and an opposed second inlet passageway is, in some embodiments, between approximately 20 and 160 degrees. In some embodiments, the inlet angles A1 and A2 are symmetrical across a line perpendicular to the longitudinal axis (e.g., A1=180−A2, where the angle is measured in degrees). In some embodiments, however, A1 and A2 are asymmetrical (A1≠180−A2).

Figure 4:
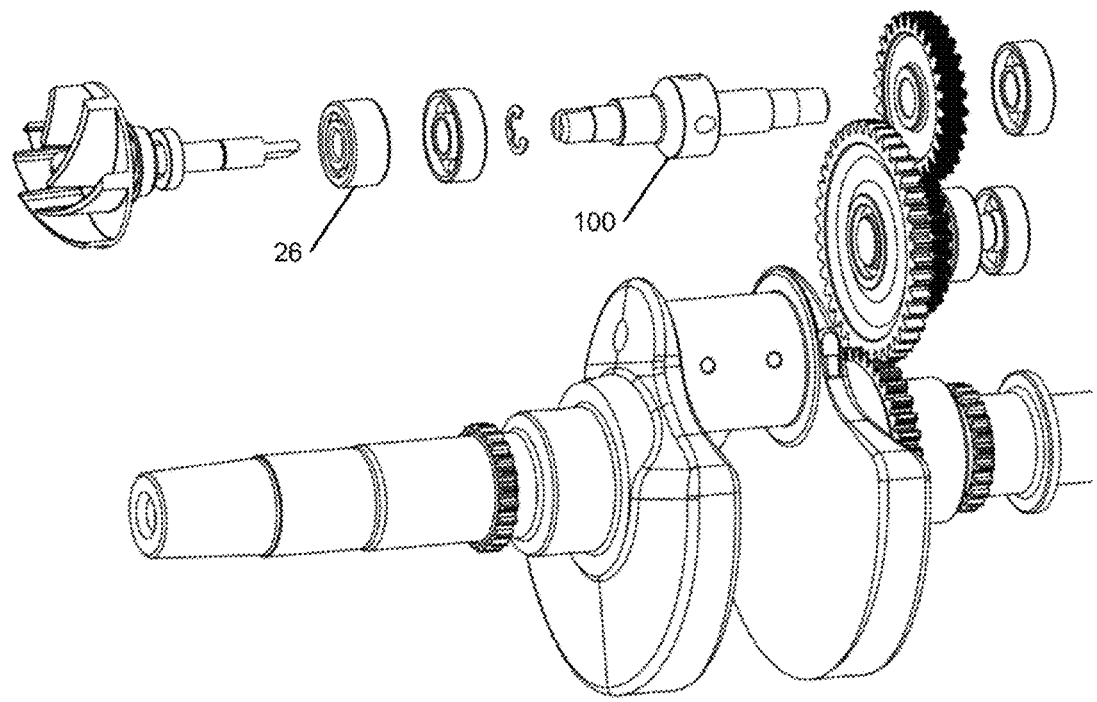
FIG. 4 is a partial exploded view of an engine.
Figure 5:
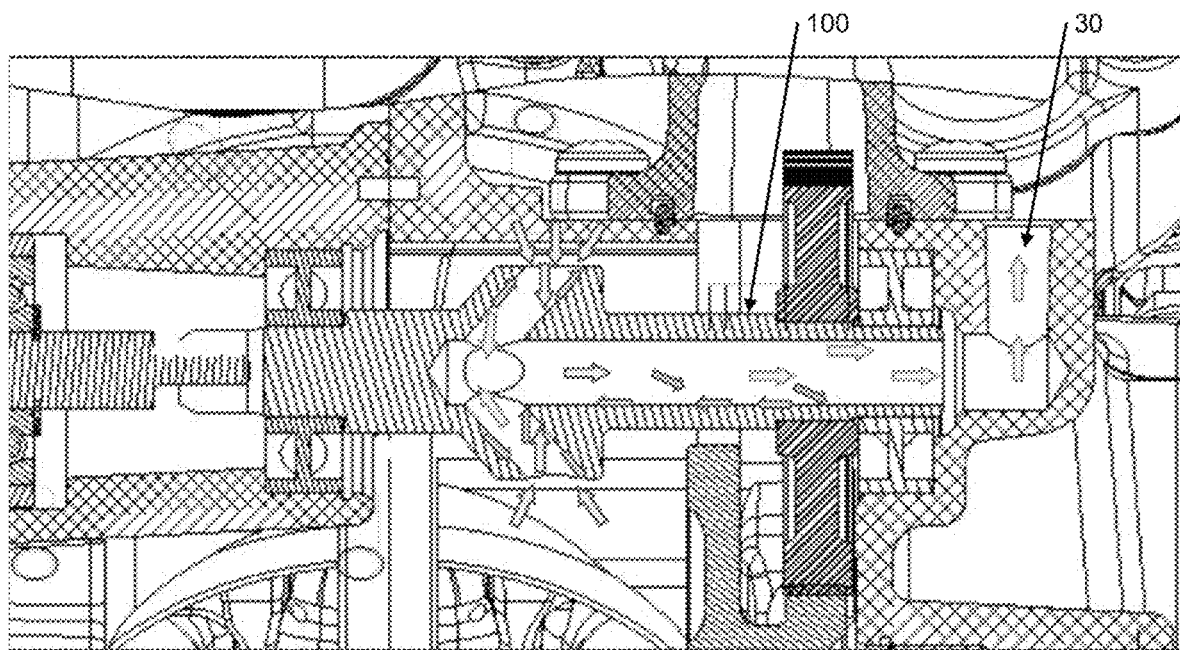
FIG. 5 is a partial sectional view of an engine that utilizes a breather shaft, the view further showing arrows indicating airflow and oil flow.
Figure 6:
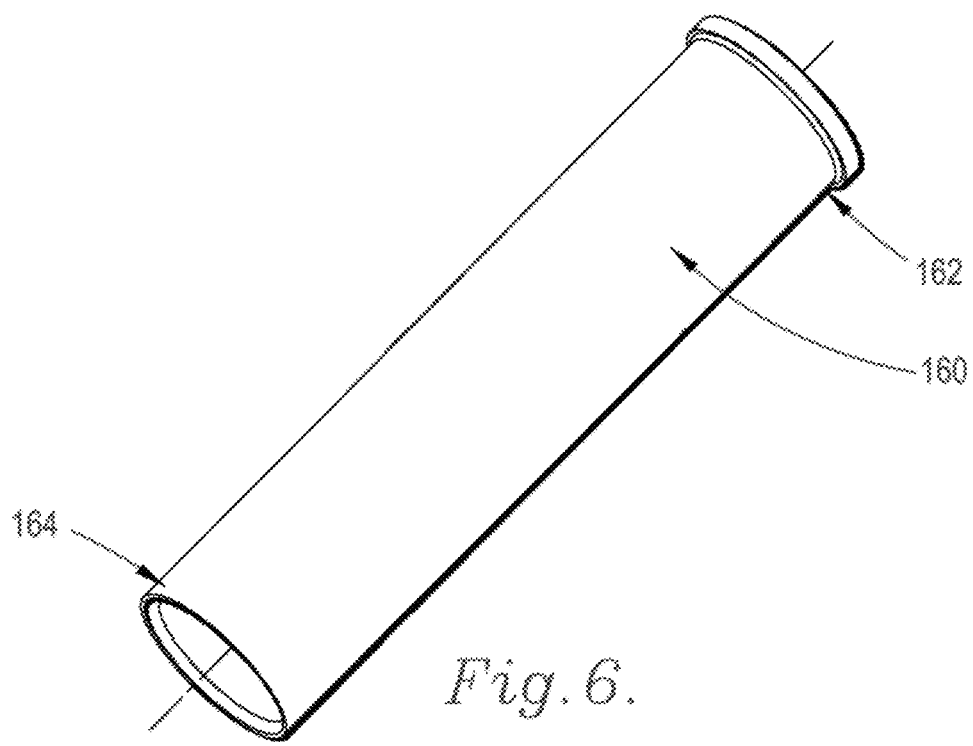
FIG. 6 is an isometric view of an embodiment of an insert.
Figure 6A:
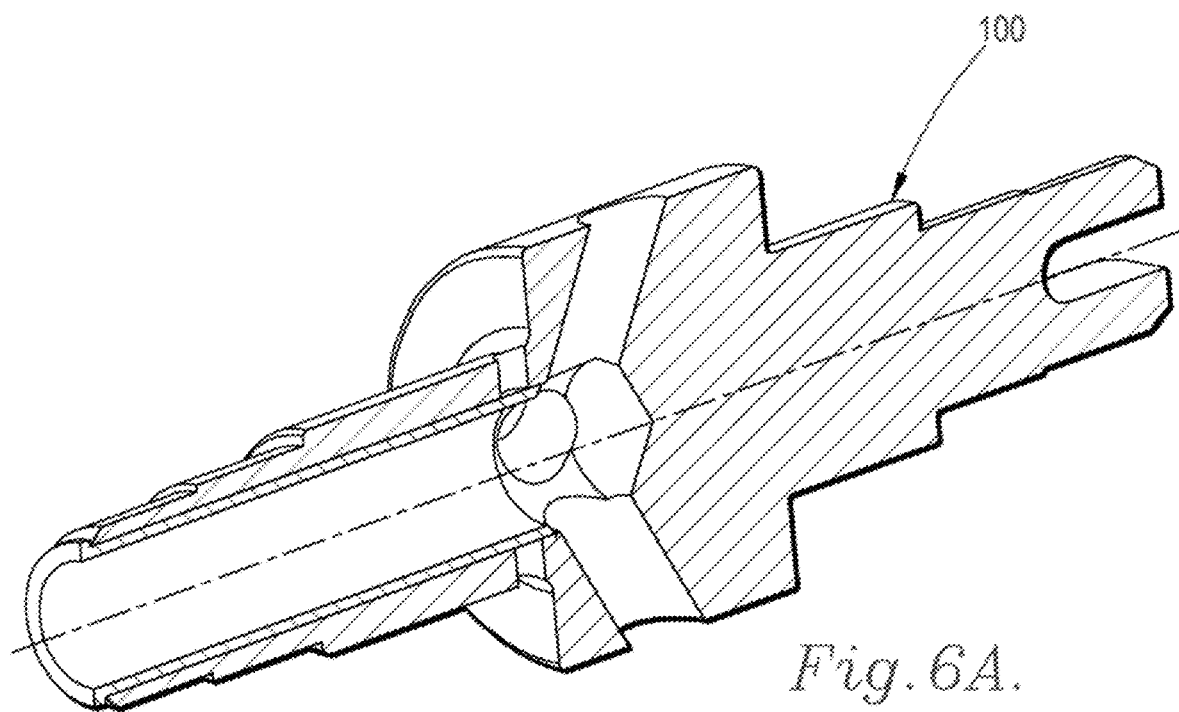
FIG. 6A is an isometric sectional view of an embodiment of a breather shaft with an insert.
Figure 6B:
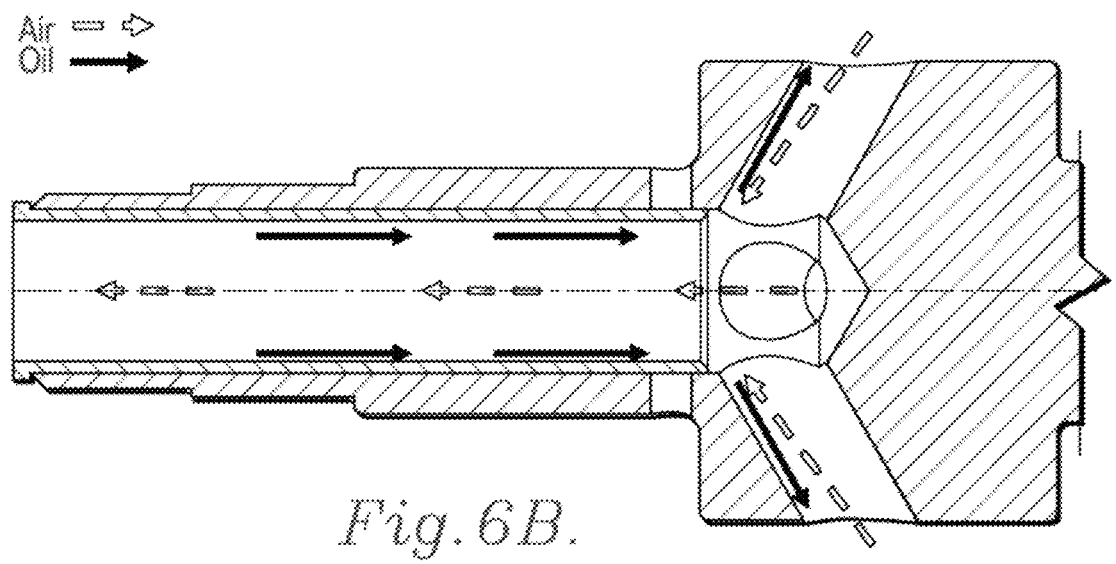
FIG. 6B is a sectional view of the breather shaft of FIG. 6A, the view further showing arrows indicating airflow and oil flow.
Figure 6C:
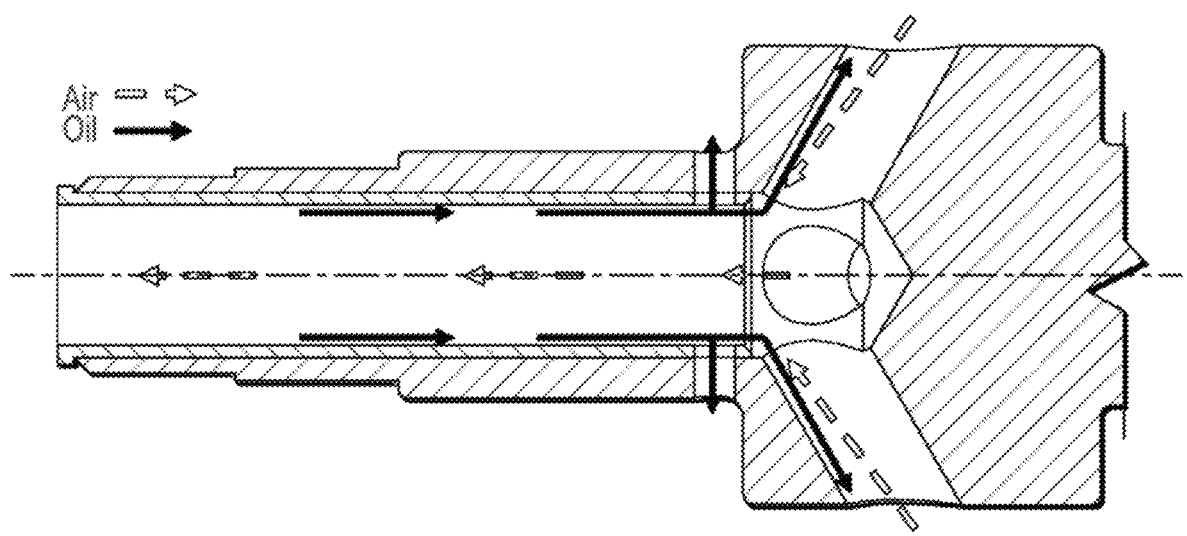
FIG. 6C is a sectional view of an embodiment of a breather shaft with an insert, the view further showing arrows indicating airflow and oil flow.

Referring to FIGS. 4 and 5, some embodiments of breather shafts are configured to be received by bearings, gears, and/or clips. In some such embodiments, the distal end 124 of the second portion 120 is configured to engage with a water pump. In other such embodiments, the distal end 114 of the first portion 110 is configured to engage with a breather hose 30.

Figure 3:
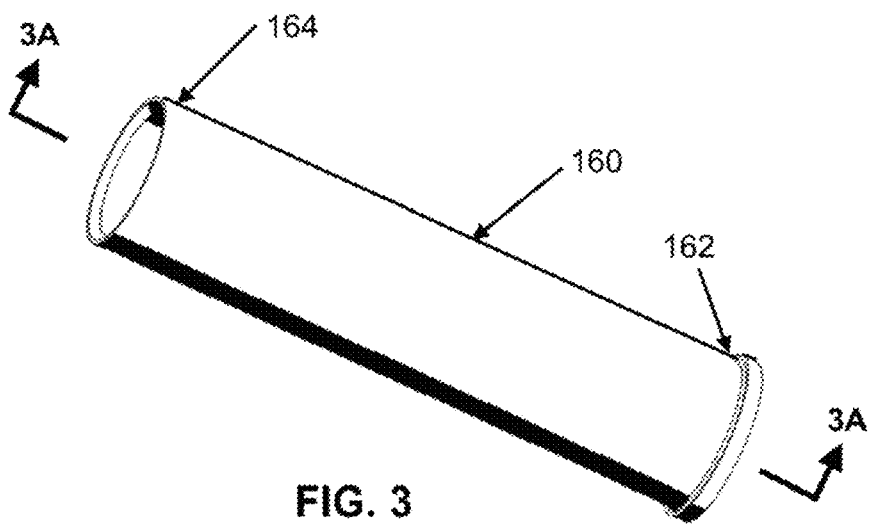
FIG. 3 is an isometric view of an insert.
Figure 3A:
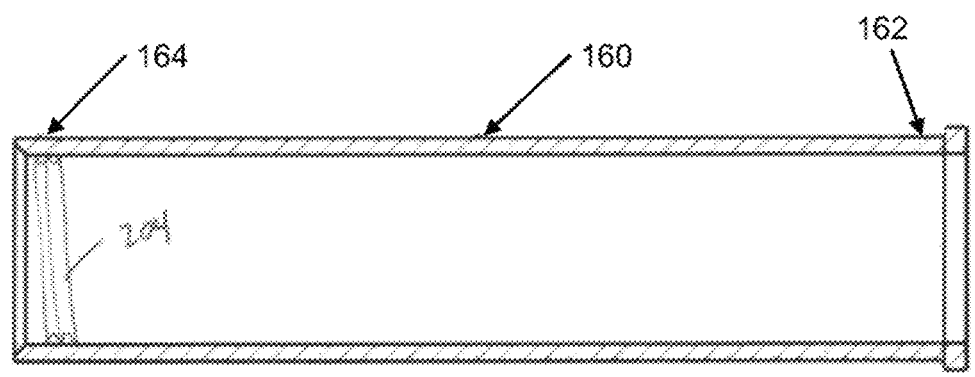
FIG. 3A is a sectional view of the insert of FIG. 3 taken along line 3A-3A of FIG. 3.

As shown in FIGS. 3 and 3A, for example, some embodiments of the breather shaft include an insert 160 extending from a distal end 114 of a first portion 110 of a breather shaft 100 towards an interior area 105 of a breather shaft. In some such embodiments, a proximal end 162 of the insert 160 is coupled to a distal end 114 of the first portion 110 of the breather shaft 100. In some embodiments, a distal end 164 of the insert 160 is positioned at, near, and/or within an interior area 105 of the breather shaft. In some embodiments, the insert 160 defines part or all of a venting passageway 115 of the breather shaft 100. In some embodiments, the insert includes one or more feature for separating oil from the crankcase air.

In some embodiments, the distal end 164 of the insert 160 includes one or more lip or ledge. In some such embodiments, oil is precipitated out of crankcase air as the crankcase air flows past such lip or ledge. In other embodiments, the insert 160 defines one or more lip, ledge, or other feature positioned along a length of a venting passageway 115 of the breather shaft 100. In some such embodiments, such lip, ledge, or other feature causes oil to precipitate out of the crankcase air, inhibits oil flow towards a vent opening 116 at a distal end 114 of a first portion 110 of the breather shaft 100, and/or biases oil towards the crankcase, such as through an oil discharge passageway 119 and/or through an inlet passageway 115. In some such embodiments, the feature includes threads formed in an outer surface of a venting passageway 115 and/or an inner surface of a centrifuge 150 of the breather shaft. In In other embodiments, an inner surface of a centrifuge 150 defines at least part of an interior area 105 of the breather shaft 100. In some embodiments, for example as shown in FIG. 3A, the insert includes the feature 204 along at least a portion of the interior thereof. By way of example, in some embodiments, the feature includes a plurality of threads, which can be left or right hand threads, as desired. In some embodiments, the threads can be cut in the direction of rotation of the assembly or in the opposite direction of rotation of the assembly. In some such embodiments, as shown for example in FIG. 2A, the inner surface of the centrifuge further defines an interior opening 156 at each location where an inlet passageway 155 extends into the interior area 105 of the breather shaft 100.

Figure 7:
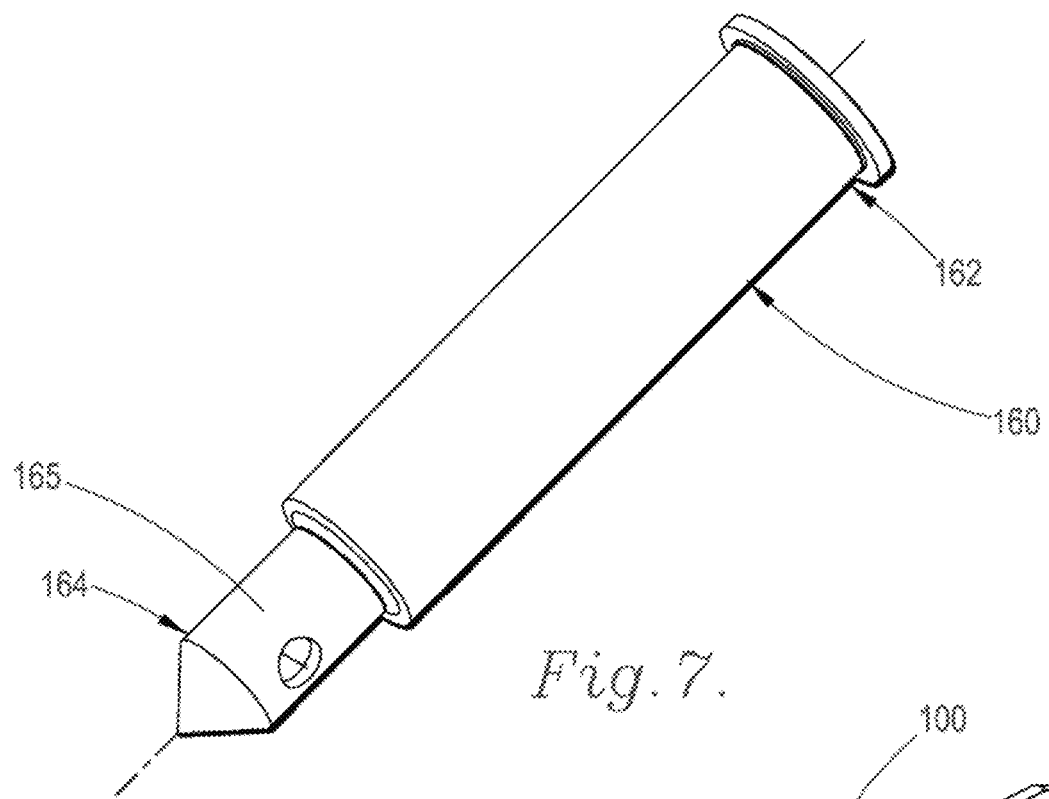
FIG. 7 is an isometric view of an embodiment of an insert.
Figure 7A:
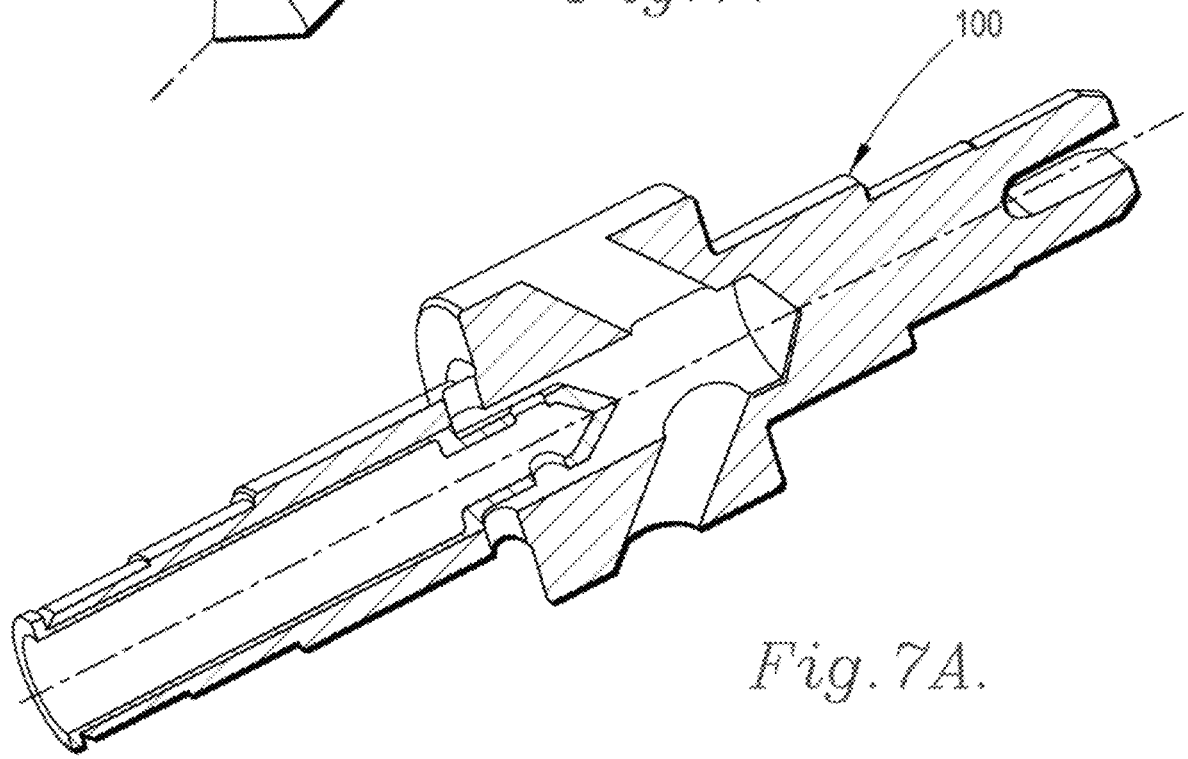
FIG. 7A is an isometric sectional view of an embodiment of a breather shaft with an insert.
Figure 7B:
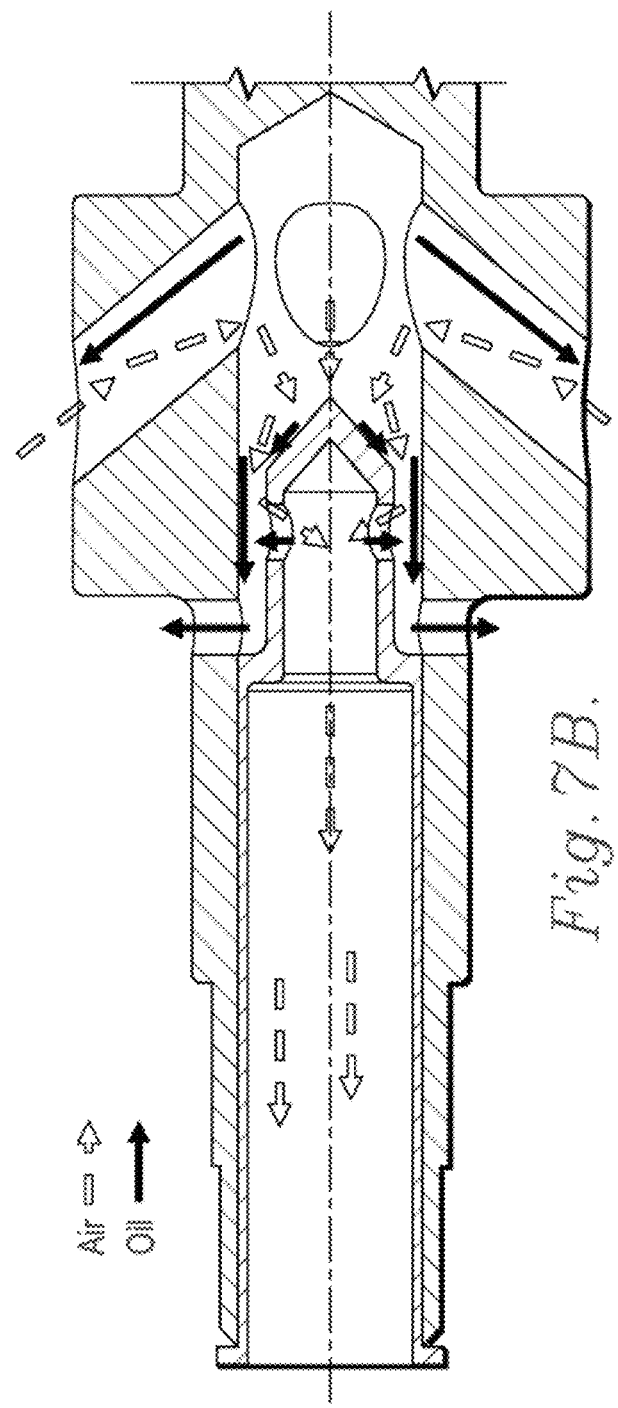
FIG. 7B is a sectional view of the breather shaft of FIG. 7A, the view further showing arrows indicating airflow and oil flow.

Referring to FIG. 7, a distal end 164 of some embodiments of an insert 160 defines an enclosed tip 165. In some such embodiments, the enclosed tip 165 defines an exterior diameter that is smaller than a diameter of the interior area 105 of the breather shaft 100. In this way, oil within the centrifuge is allowed to flow past the enclosed tip of the inlet along the walls of the centrifuge towards an oil discharge passageway 119. In some embodiments, the enclosed tip defines an interior area that is in fluid communication with the venting passageway 115 of the first portion 110 of the breather shaft 100. In some such embodiments, the enclosed tip further defines one or more air passageways extending from the interior area 105 of the breather shaft 100 that is defined by the centrifuge 150 into the interior area of the enclosed tip. In this way, high pressure within the centrifuge drives crankcase air towards the vent opening of the breather shaft while centrifugal force associated with the centrifuge drives oil out towards the oil discharge passageways.

Figure 8:
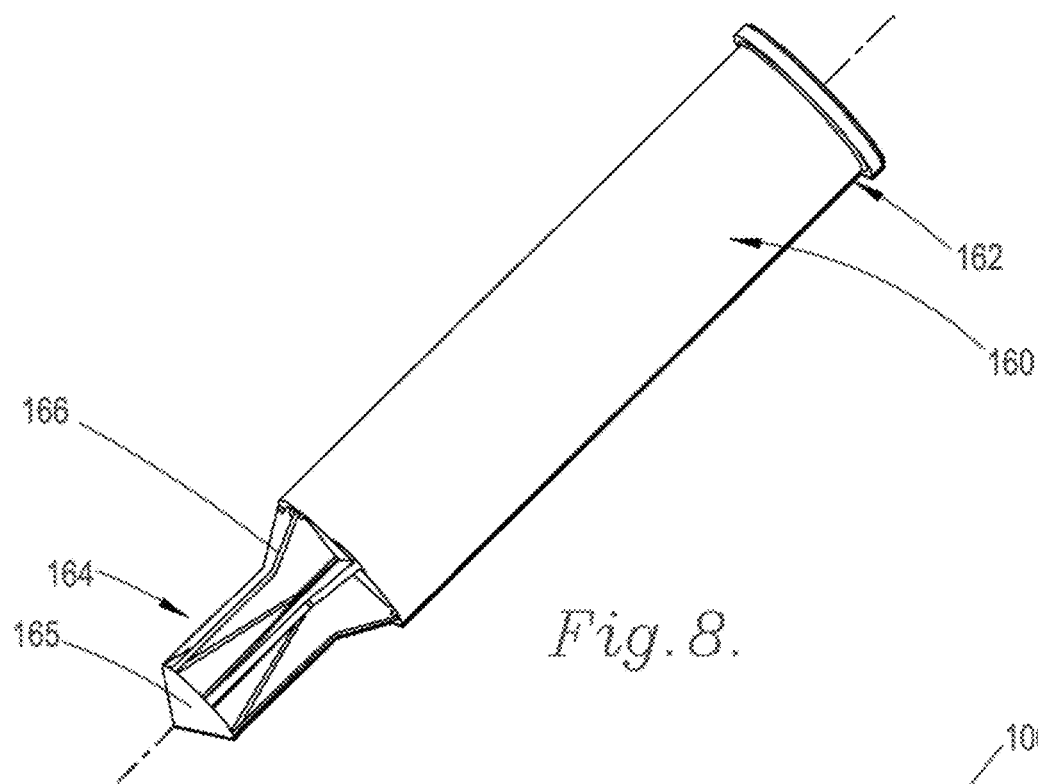
FIG. 8 is an isometric view of an embodiment of an insert.
Figure 8A:
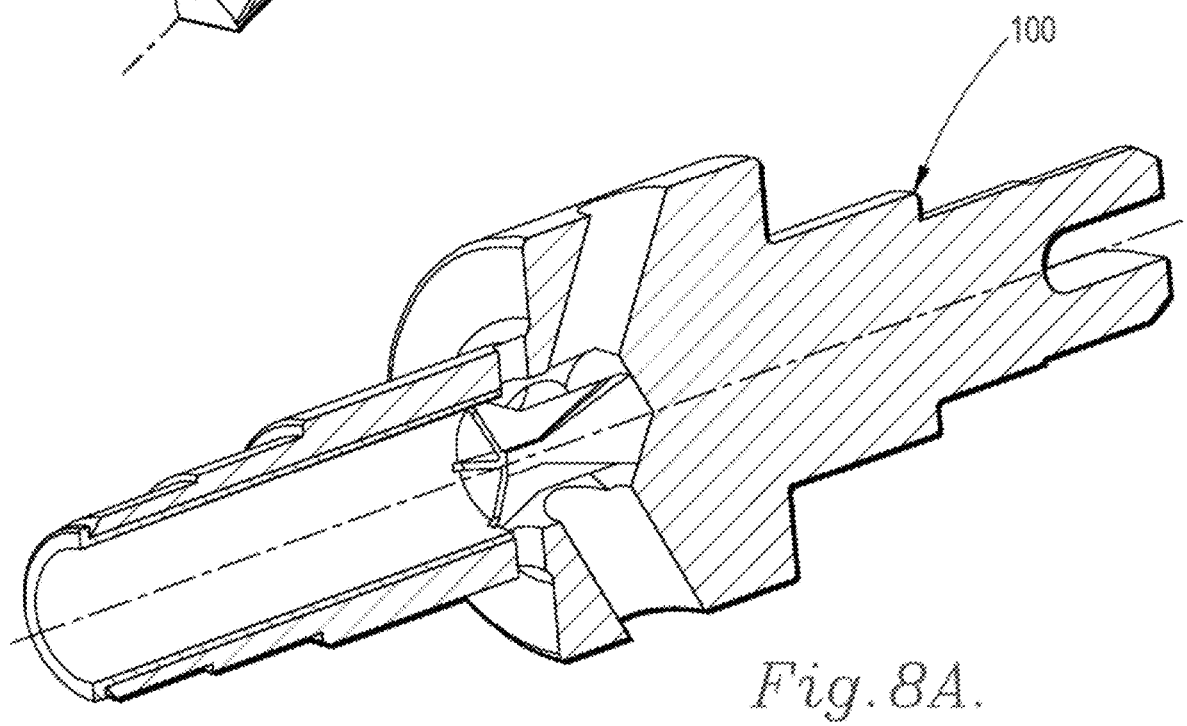
FIG. 8A is an isometric sectional view of an embodiment of a breather shaft with an insert.
Figure 9:
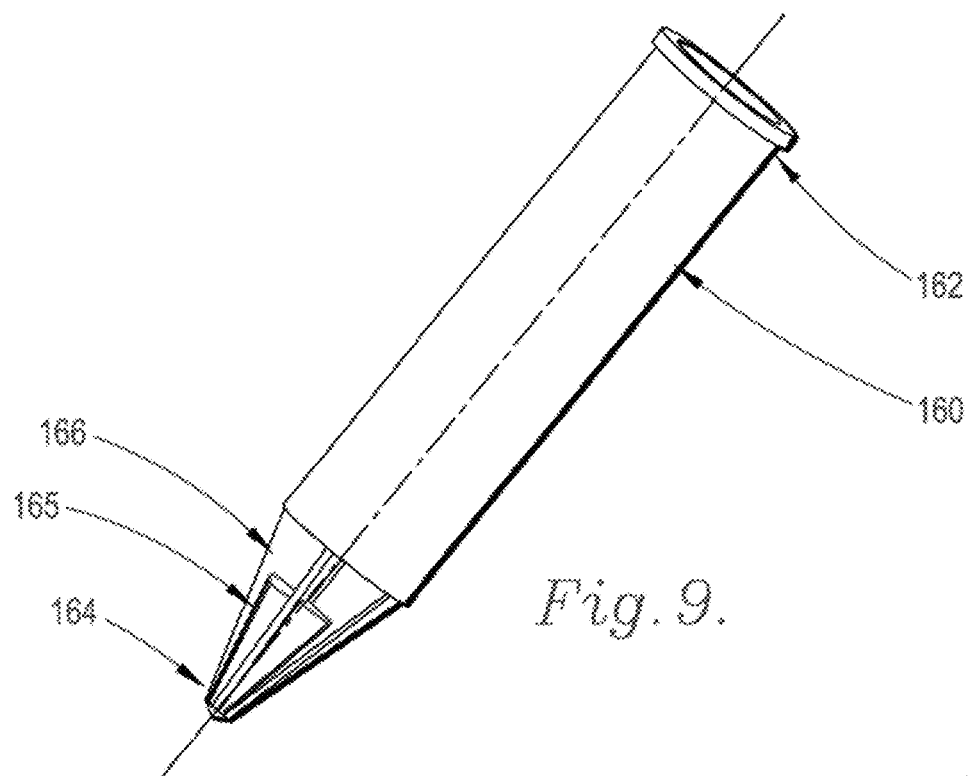
FIG. 9 is an isometric view of an embodiment of an insert.
Figure 9A:
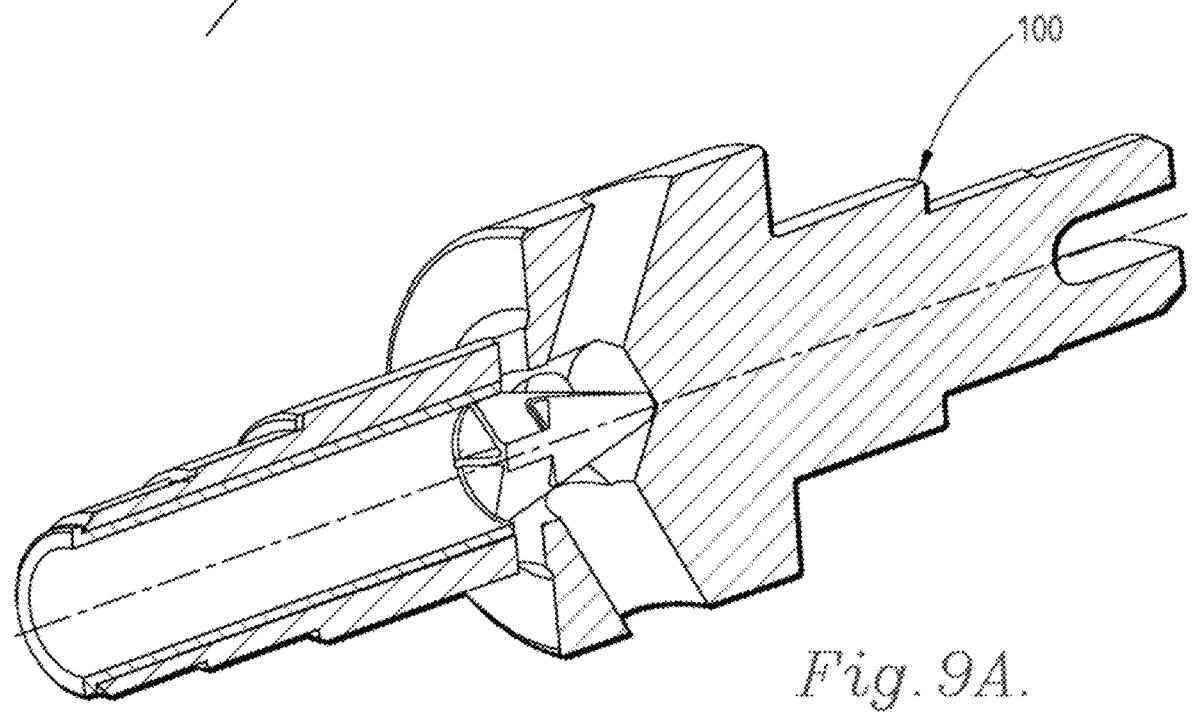
FIG. 9A is an isometric sectional view of an embodiment of a breather shaft with an insert.

Referring to FIG. 8, a distal end 164 of an insert 160 of some embodiments defines one or more blade member 166. In some such embodiments, the one or more blade member 166 is generally perpendicular to the longitudinal axis of the breather shaft. In this way, centrifugal force associated with rotation of the breather shaft causes oil to flow from the blade members 166 of the insert out towards the crankcase, such as out towards an interior surface of a centrifuge and/or out towards a passageway of the breather shaft. In some such embodiments, crankcase air is allowed to flow past a plurality of blade members and into a venting passageway of the breather shaft. Referring to FIG. 9, some such embodiments include a bull nose coupled to a distal end of each blade. In other such embodiments, each blade extends, at least partially from an exterior surface of a bull nose.

In some embodiments, a diameter of an inlet passageway 155 is between 30% and 80% of the diameter of a venting passageway 115 such that the cross-sectional area of the inlet passageway 155 is between approximately 9% and 64% of the cross sectional area of the venting passageway 115. In some such embodiments having a single inlet passageway 155, crankcase air flows faster through the inlet passageway 155 than it does through the venting passageway 115. In other such embodiments having a plurality of inlet passageways 155, crankcase air still flows faster through the inlet passageways 155 than it does through the venting passageway 115. In some embodiments having a plurality of inlet passageways 155, crankcase air flows slower through the inlet passageways 155 than it does through the venting passageway 115. In some embodiments having a plurality of inlet passageways 155, crankcase air flows through the inlet passageways 155 and the venting passageways 115 at approximately the same flow rate.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:
1. A breather shaft comprising:
a centrifuge having opposed first and second ends; and
a first portion extending from the first end of the centrifuge, a proximal end of the first portion being fixed to the first end of the centrifuge,
wherein the centrifuge defines an inlet passageway extending from an exterior surface of the centrifuge to an interior area of the centrifuge,
wherein a distal end of the first portion defines a vent opening,
wherein the first portion defines a venting passageway extending from the vent opening to the interior area of the centrifuge, and
wherein the breather shaft further comprises an insert having a main body positioned at least partially within the venting passageway of the first portion, an outer surface of the main body of the insert being engaged with an inner surface of the first portion.

2. The breather shaft of claim 1, wherein the breather shaft is a water pump shaft.

3. The breather shaft of claim 1, further comprising a second portion extending from the second end of the centrifuge such that the centrifuge is positioned between the first and second portions, a proximal end of the second portion being fixed to the second end of the centrifuge.

4. The breather shaft of claim 1, wherein the inlet and venting passageways each form part of a fluid passageway of the breather shaft, and wherein the inlet passageway is oriented at a first angle and the venting passageway is oriented at a second angle such that the fluid passageway includes a transition area defining an acute angle.

5. The breather shaft of claim 1, wherein the insert further comprises opposed proximal and distal ends, the proximal end of the insert being adjacent to a distal end of the first portion and the distal end of the insert extending into the interior area of the centrifuge.

6. The breather shaft of claim 5, wherein the distal end of the insert comprises a tip.

7. The breather shaft of claim 6, wherein the distal end of the insert comprises a plurality of blades extending radially from the tip.

8. The breather shaft of claim 6, wherein an outer diameter of the tip is smaller than a diameter of the interior area of the centrifuge, thereby forming a void around the tip of the insert.

9. The breather shaft of claim 5, wherein the distal end of the insert comprises a plurality of radially oriented blades, the blades being spaced, thereby forming a plurality of voids between the blades.

10. An engine comprising:
a case defining an interior volume; and
a breather shaft extending through a wall of the case, wherein the breather shaft comprises:
  a centrifuge having opposed first and second ends, the centrifuge being positioned within the interior volume of the case; and
  a first portion extending from the first end of the centrifuge, a proximal end of the first portion being fixed to the first end of the centrifuge,
wherein an interior area of the centrifuge is in fluid communication with an exterior volume through a venting passageway of the first portion,
wherein the centrifuge defines an inlet passageway extending from an exterior surface of the centrifuge to the interior area of the centrifuge,
wherein the breather shaft further comprises an insert having a main body positioned at least partially within the venting passageway of the first portion, an outer surface of the main body of the insert being engaged with an inner surface of the first portion, and
wherein the insert further comprises opposed proximal and distal ends, the proximal end of the insert being adjacent to a distal end of the first portion and the distal end of the insert extending into the interior area of the centrifuge.

11. The engine of claim 10, further comprising a water pump, wherein the breather shaft and the water pump extend along a common axis of rotation.

12. The engine of claim 10, further comprising a second portion extending from the centrifuge such that the second portion of the breather shaft is positioned within the interior volume of the case.

13. The engine of claim 10, wherein the inlet and venting passageways each form part of a fluid passageway of the breather shaft, and wherein the inlet passageway is oriented at a first angle and the venting passageway is oriented at a second angle such that the fluid passageway includes a transition area defining an acute angle.

14. The engine of claim 10, wherein the distal end of the insert comprises a tip and a plurality of blades extending radially from the tip.

15. The engine of claim 10, wherein the distal end of the insert comprises a tip, and wherein an outer diameter of the tip is smaller than a diameter of the interior area of the centrifuge, thereby forming a void around the tip of the insert.

16. The engine of claim 10, wherein the distal end of the insert comprises a plurality of radially oriented blades, the blades being spaced apart, thereby forming a plurality of voids between the blades.

17. A method of venting air from an engine crankcase, the method comprising:
directing crankcase air through an inlet passageway defined by a centrifuge of a breather shaft, the inlet passageway extending from an exterior surface of the centrifuge to an interior area of the centrifuge;
removing oil particles from the crankcase air, thereby creating venting air;
directing the venting air through a venting passageway of a first portion of the breather shaft, the first portion extending from a first end of the centrifuge, a proximal end of the first portion being fixed to the first end of the centrifuge, and
directing the venting air into an interior area of an insert of the breather shaft, a main body of the insert being positioned at least partially within the venting passageway of the first portion such that venting air through the venting passageway of the first portion comprises directing the venting air through the interior area of the insert.

* * * * *

UNITED STATES PATENT AND TRADEMARK OFFICE
CERTIFICATE OF CORRECTION

| | |
|---|---|
| PATENT NO. | : 11,840,946 B2 |
| APPLICATION NO. | : 17/963050 |
| DATED | : December 12, 2023 |
| INVENTOR(S) | : Eberhardt et al. |

It is certified that error appears in the above-identified patent and that said Letters Patent is hereby corrected as shown below:

In the Specification

In Column 4, Line 64, delete "1)." and insert -- 1B). --, therefor.

Signed and Sealed this
Twentieth Day of February, 2024

Katherine Kelly Vidal
*Director of the United States Patent and Trademark Office*